(12) United States Patent
Oetlinger

(10) Patent No.: US 10,648,496 B2
(45) Date of Patent: May 12, 2020

(54) MOUNT

(71) Applicant: Blanking Systems, Inc., Grafton, WI (US)

(72) Inventor: Frank E. Oetlinger, Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 282 days.

(21) Appl. No.: 15/635,429

(22) Filed: Jun. 28, 2017

(65) Prior Publication Data

US 2019/0003500 A1    Jan. 3, 2019

(51) Int. Cl.

| F16B 5/02 | (2006.01) |
|---|---|
| F16B 12/02 | (2006.01) |
| F16B 12/30 | (2006.01) |
| F16B 37/04 | (2006.01) |
| F16B 12/50 | (2006.01) |
| F16B 7/18 | (2006.01) |

(52) U.S. Cl.
CPC .............. *F16B 5/02* (2013.01); *F16B 5/0241* (2013.01); *F16B 7/187* (2013.01); *F16B 12/02* (2013.01); *F16B 12/30* (2013.01); *F16B 12/50* (2013.01); *F16B 37/045* (2013.01); *F16B 37/047* (2013.01)

(58) Field of Classification Search
CPC .......... F16B 5/02; F16B 37/045; F16B 12/30; F16B 12/02; F16B 37/047; F16B 12/50; F16B 7/187; F16B 5/0241
USPC ................ 403/257, 258, 381; 238/329, 330; 52/653.1; 411/371.2; 248/316.4
See application file for complete search history.

(56) References Cited

U.S. PATENT DOCUMENTS

| 4,568,041 A * | 2/1986 | Whitham .............. F42B 10/64 403/258 X |
|---|---|---|
| 6,582,149 B1 | 6/2003 | Holscher |
| 6,634,844 B2 | 10/2003 | Huber |
| 9,016,972 B2 * | 4/2015 | Oetlinger ............... F16B 12/50 |
| 9,895,839 B2 * | 2/2018 | Ogawa .................... B29C 65/48 |
| 2010/0303538 A1 | 12/2010 | Kor et al. |
| 2018/0298931 A1 * | 10/2018 | Oetlinger .............. F16B 5/0642 |

FOREIGN PATENT DOCUMENTS

GB          7648    *  6/1898 ................... 403/257

OTHER PUBLICATIONS

PCT/US2018/039742, International Search Report and Written Opinion dated Oct. 25, 2018, 7 pages.

* cited by examiner

*Primary Examiner* — Greg Binda
(74) *Attorney, Agent, or Firm* — Boyle Fredrickson, S.C.

(57) ABSTRACT

A mount is provided for mounting a plate to a frame assembly. The mount includes a generally cylindrical head extendable through an aperture the plate and having an upper surface, a lower face, an outer peripheral surface, and an alignment structure receivable in a slot of the frame member of the frame assembly. The cylindrical head includes a bolt-receiving bore extending through the cylindrical head along a bore axis at an acute angle to the upper face that is adapted to receive a bolt therethrough. A flange extends radially extending from the outer peripheral surface of the cylindrical head. The flange has a diameter greater than the diameter of at least a portion of the aperture through the plate. Tightening of the bolt captures the plate between the flange and the frame member.

11 Claims, 11 Drawing Sheets

US 10,648,496 B2

MOUNT

FIELD OF THE INVENTION

This invention relates generally to frame assemblies that are used in the manufacture of automation equipment, buildings, furniture, and/or other components, and in particular, to a mount for mechanically interlocking a plate to frame member of a frame assembly or for interconnecting multiple frame members to each other.

BACKGROUND AND SUMMARY OF THE INVENTION

As is known, structural frames are used in the construction of a wide variety of products, including everything from automation equipment and furniture to buildings and the like. Structural frames typically incorporate horizontal and vertical frame members tied together by corner pieces, joints or bonding. Coverings, such as panels, may be secured to the frame members to isolate the interior of the structural frames and/or to provide an aesthetically pleasing appearance. In addition, various components may be interconnected to the structural frame to allow the structural frame to be used for its intended purpose. By way of example, hinges may be interconnected to the structural frame to facilitate the mounting of a door thereto. Alternatively, sliders may be interconnected to the sides of a structural frame so as to allow the structural frame to function as a drawer. It can be appreciated that other types of components may be interconnected to the structural frame to facilitate the intended purpose thereof.

Typically, the components of a structural frame are held together by means of friction. For examples, nut and bolt combinations are often used to secure horizontal and vertical frame members together. However, the nut and bolt combinations holding the structural frames together often come loose over time when subjected to vibration and/or the environment. As the nut and bolt combinations loosen, the integrity of the structural frame may be compromised. Further, as the nut and bolt combinations loosen, the frame members and the components therefore rotate with respect to one another, thereby compromising the alignment of the structural frame.

Therefore, it is a primary object and feature of the present invention to provide a mount which mechanically interlocks a panel or plate to a frame member in such a manner as to maintain connection of the plate to the frame member during repeated use.

It is a further object and feature of the present invention to provide a mount which allows for a plate or panel to be simply and easily mechanically interlocked to a frame member.

It is a still further object and feature of the present invention to provide a mount which allows for a plate or panel to be mechanically interlocked to a frame member and which is adapted for a variety of uses.

It is a still further object and feature of the present invention to provide a mount which mechanically interconnects multiple frame members together at a user desired angle to each other and which maintains the connection between the frame members during repeated use.

In accordance with the present invention, a mount is provided for mounting a plate having an inner face, an outer face and an aperture defined by an inner surface extending between the inner face and the outer face to a frame assembly including a frame member having an outer surface, defining a longitudinal axis, and having a slot that extends parallel to the longitudinal axis and a cavity that extends parallel to the longitudinal axis and connects to the slot. The mount includes a nut receivable in the cavity and a generally cylindrical head extending along a head axis, being receivable in the aperture in the plate and having an upper surface, a lower face, an outer peripheral surface, an alignment structure receivable in the slot of the frame member, and a bolt-receiving bore extending through the cylindrical head along a bore axes at an acute angle to the head axis. The outer peripheral surface of the cylindrical head including a tapered portion frictionally engageable with the inner surface of the plate. A flange extends radially from the outer peripheral surface of the cylindrical head. The flange has a diameter. A bolt extends angularly through the slot and is engageable with the nut received in the cavity so to interconnect the cylindrical head to the frame member. Threading the bolt into the nut exerts a clamping force on the plate between the flange and the frame member.

The frame member includes an outer abutment wall that defines at least a portion of a periphery the slot, an inner abutment wall that is connected to the outer abutment wall and that defines at least a portion of a periphery of the cavity, and an edge defined at a location of connection between the outer and inner abutment walls. The edge defines a pivot point about which the nut can pivot when the nut engages the edge while moving angularly through the cavity. The nut further includes a top wall and a shoulder that extend in a transverse direction away from the top wall. The shoulder engages the inner abutment wall of the frame member. The nut includes a sidewall that extends between the top wall and the shoulder.

The alignment structure includes first and second alignment walls intersecting the lower face of the cylindrical head. The first and second alignment walls diverge from each other as the first and second alignment walls extend away from the lower face of the cylindrical head. The bolt-receiving bore includes an enlarged portion communicating with the upper surface of the cylindrical head and is adapted for receiving a head of the bolt therein. The bolt-receiving bore also includes a reduced diameter portion having a first end communicating with the enlarged portion of the bolt-receiving bore and a second end communicating with lower face of the cylindrical head. The reduced diameter portion of the bolt-receiving bore is adapted for receiving a shaft of the bolt therethrough.

In accordance with a further aspect of the present invention, a mount for mounting a plate to a frame assembly. A generally cylindrical head extends along a head axis, is receivable in an aperture in the plate and has an upper surface, a lower face, an outer peripheral surface. An alignment structure is receivable in a slot of a frame member of the frame assembly. A bolt-receiving bore extends through the cylindrical head along a bore axis at an acute angle to the head axis. The outer peripheral surface of the cylindrical head includes a tapered portion. A flange extends radially from the outer peripheral surface of the cylindrical head. The flange has a diameter.

The alignment structure includes first and second alignment walls intersecting the lower face of the cylindrical head. The first and second alignment walls diverge from each other as the first and second alignment walls extend away from the lower face of the cylindrical head. The bolt-receiving bore includes an enlarged portion communicating with the upper surface of the cylindrical head and is adapted for receiving a head of a bolt therein. The bolt-receiving bore includes a reduced diameter portion having a first end communicating with the enlarged portion of the bolt-receiving bore and a second end communicating with lower face of the cylindrical head. The reduced diameter portion of the bolt-receiving bore is adapted for receiving a shaft of the bolt therethrough. A bolt and nut combination is provided for interconnecting the plate mount to the frame member of the frame assembly. The bolt is extendable through the bolt-receiving bore and the nut receivable in the slot in the frame assembly.

In according with a still further aspect of the present invention, a frame assembly is provided. The frame assembly includes a frame member having an outer surface, defining a longitudinal axis, and having a slot that extends parallel to the longitudinal axis and a cavity that extends parallel to the longitudinal axis and connects to the slot. A plate has an inner face, an outer face and an aperture defined by an inner surface extending between the inner face and the outer face. A nut receivable in the cavity. A mount has a generally cylindrical head extending along a head axis, is receivable in the aperture in the plate and has an upper surface, a lower face, an outer peripheral surface. The mount further includes an alignment structure is receivable in a slot of a frame member of the frame assembly and a bolt-receiving bore extending through the cylindrical head along a bore axes at an acute angle to the head axis. The outer peripheral surface of the cylindrical head include a tapered portion. A flange extends radially form the outer peripheral surface of the cylindrical head. The flange has a diameter greater than the diameter of the aperture in the plate. A bolt extends angularly through the bolt-receiving bore and engages the nut received in the cavity so to interconnect the cylindrical head to the frame member and capture the plate between the flange and the frame member.

The alignment structure includes first and second alignment walls intersecting the lower face of the cylindrical head. The first and second alignment walls diverge from each other as the first and second alignment walls extend away from the lower face of the cylindrical head. The bolt-receiving bore includes an enlarged portion communicating with the upper surface of the cylindrical head and is adapted for receiving a head of a bolt therein. The bolt-receiving bore includes a reduced diameter portion having a first end communicating with the enlarged portion of the bolt-receiving bore and a second end communicating with lower face of the cylindrical head. The reduced diameter portion of the bolt-receiving bore is adapted for receiving a shaft of the bolt therethrough.

BRIEF DESCRIPTION OF THE DRAWINGS

The drawings furnished herewith illustrate a preferred construction of the present invention in which the above advantages and features are clearly disclosed, as well as others which will be readily understood from the following description of the illustrated embodiment.

In the drawings.

DETAILED DESCRIPTION OF THE DRAWINGS

Figure 1:
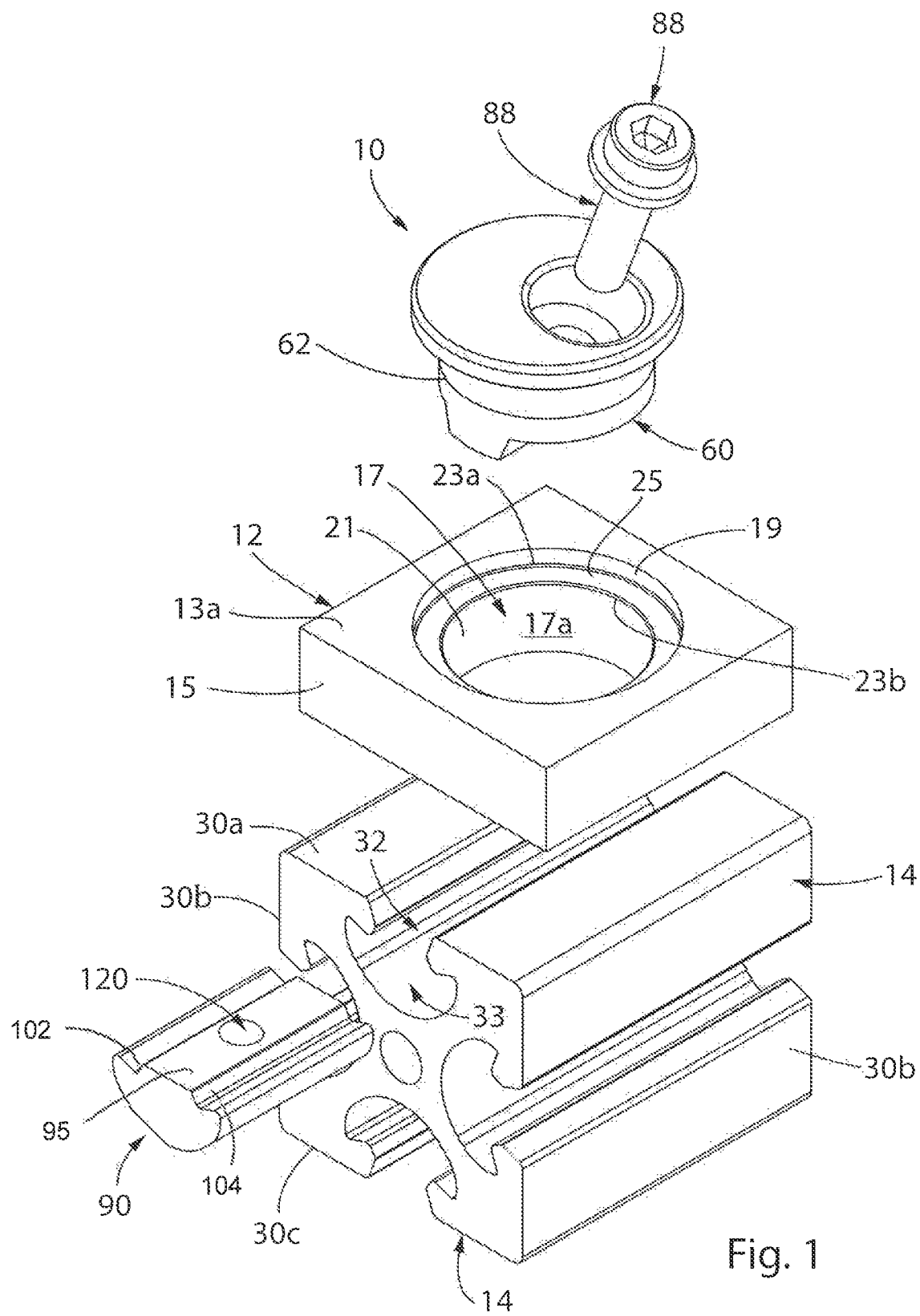
FIG. 1 is an exploded, isometric view of a mount in accordance with the present invention for mounting a plate to a frame member.
Figure 2:
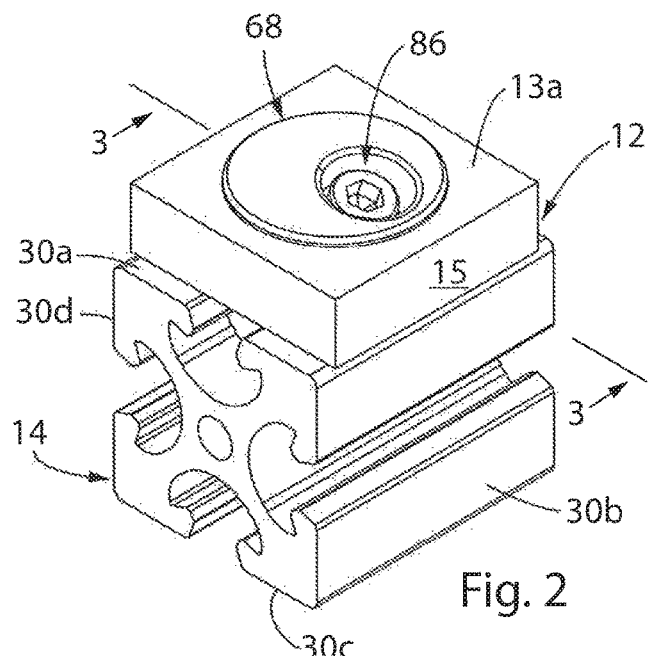
FIG. 2 is an isometric view of the mount of FIG. 1 mounting a plate to a frame member.

Referring to FIGS. 1-7, a mount in accordance with a first aspect of the present invention is generally designated by the numeral 10. As hereinafter described, it is intended to mount 10 to interconnect plate 12 to a rail or frame member 14 of a frame assembly constructed from various components. Plate 12 includes first and second sides 13a and 13b, respectively, spaced by outer periphery 15. In the depicted embodiment, plate 12 has a generally square configuration. However, plate 12 may have other configurations, for example, round, rectangular, triangular, or some other polygonal shape (not illustrated), without deviating from the scope of the present invention. Plate 12 further includes aperture 17 extending therethrough between the first and second sides 13a and 13b, respectively, along an axis and having a diameter of sufficient dimension to allow for outer surface 62 of cylindrical head 60 to pass therethrough, for reasons hereinafter described. Aperture 17 is defined by a generally circular sidewall 19 extending from first side 13a of plate 12 and having a first diameter, and a generally circular sidewall 21 extending from second side 13b of plate 12 and having a second diameter less than the first diameter. Inner edges 23a and 23b of sidewalls 19 and 21, respectively, are interconnected by shoulder 25 lying in a plane generally perpendicular to the axis of aperture 17. Circular sidewalls 19 and 21 define a thickness T of plate 12, FIG. 3.

Figure 3:
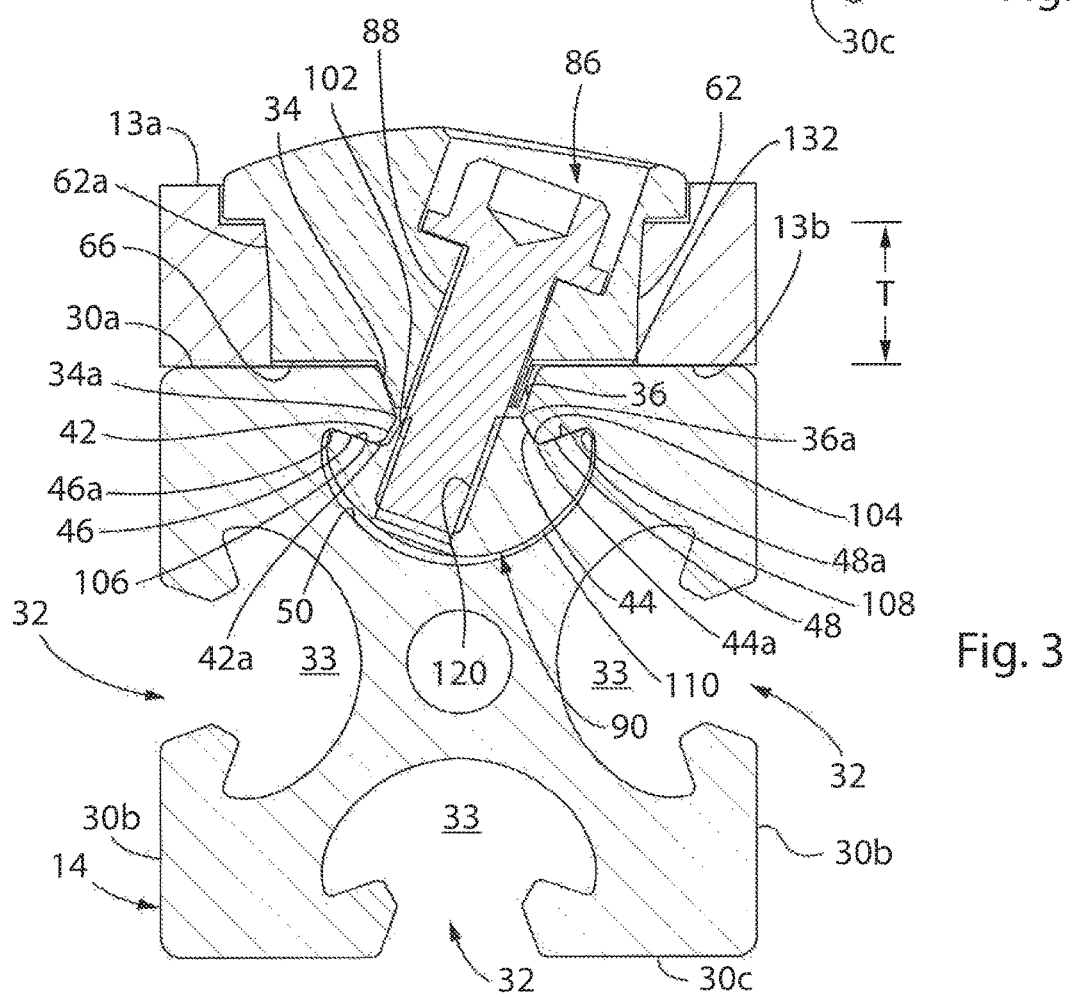
FIG. 3 is a cross-sectional view of the mount of the present invention taken along line 3-3 of FIG. 2.

Frame member 14 has a generally square configuration or cross-sectional profile shape and extends along a longitudinal axis. In alternate embodiments, the frame members 14 may have different cross-sectional profile shapes, for example, round, rectangular, triangular, or some other polygonal shape (not illustrated), depending on the desired end-use configuration. Frame member 14 has an outer surface that is defined by four faces 30a-30d. Each face 30a-30d is identical in structure and, as such, the description hereinafter of face 30a is understood to describe faces 30b-30d, as if fully described herein. As best seen in FIG. 3, each face 30a of frame member 14 is generally flat and includes slot 32 therein that extends along the entire length thereof and that opens into a longitudinally extending cavity 33. Slot 32 and cavity 33 are substantially symmetrical, whereby description of structures at one side of the slot 32 and/or cavity 33 are equally applicable to the corresponding structures on the other side of the slot 32 and/or cavity 33, only being mirror images thereof.

Slot 32 is defined between first and second sidewalls 34 and 36, respectively, extending from face 30a at angles thereto. It is contemplated that the angles fall within the range of 1° and 89°, but is preferably between about 30° to about 80° and is most preferably about 70°. Correspondingly, in such a most preferred embodiment, each of the first and second sidewalls 34 and 36, respectively, defines an angle of about 20° with respect to an imaginary line that extends through the centerline of the slot 32, whereby the first and second sidewalls 34 and 36, respectively, define an angle of about 40° between each other. Slot 32 is further defined between first and second outer abutment walls 42 and 44, respectively, which diverge from corresponding terminal edges 34a and 36a, respectively, of first and second sidewalls 34 and 36, respectively. First outer abutment wall 42 angularly intersects first sidewall 34 to define an angle that is greater than 90° therebetween and second outer abutment wall 44 angularly intersects sidewall 36 to define an angle that is greater than 90° therebetween. Preferably, an angle defined between the first outer abutment wall 42 and the first sidewall 34 is between about 110° to about 160° and is most preferably about 130°.

From respective outermost portions, first and second inner abutment walls 46 and 48, respectively, define lines that extend angularly down and away from the face 30a, toward a middle portion of the cavity 33. Stated another way, from the inner lands 42a and 44a that connect the first and second outer abutment walls 42 and 44, respectively, to corresponding first and second inner abutment walls 46 and 48, respectively, the first and second inner abutment walls 46 and 48, respectively, extend in opposing directions that diverge from each other and toward the face 30a. Inner land 42a defines a flat surface that defines an edge at the intersection of corresponding outer and inner abutment walls 42 and 46, respectively. Similarly, inner land 44a defines a flat surface that defines an edge at the intersection of corresponding outer and inner abutment walls 44 and 48, respectively. First and second outer abutment walls 42 and 44, respectively, are at steeper angles or relatively closer to orthogonal with respect to the face 30a than are first and second inner abutment walls 46 and 48, respectively, which are relatively closer to parallel with respect to the face 30a. First and second outer abutment walls 42 and 44, respectively, in one preferred embodiment, define angles of about 60° with respect to the face 30a, whereas first and second inner abutment walls 46 and 48 of this embodiment define angles of about 20° or 19° with respect to the face 30a. Concave terminal wall 50 extends between terminal edges 46a and 48a, respectively, of first and second inner abutment walls 46 and 48, respectively, and the cavity 33 is defined between the inner abutment walls 46, 48 and the concave terminal wall 50.

Figure 4:
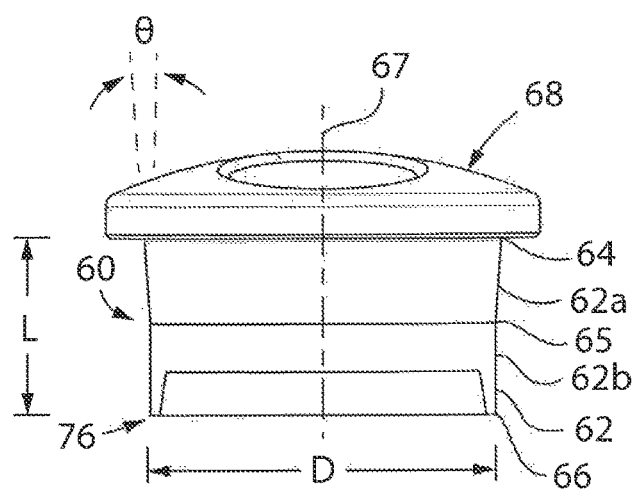
FIG. 4 is a side elevational view of a cylindrical head of the mount of the present invention.
Figure 5:
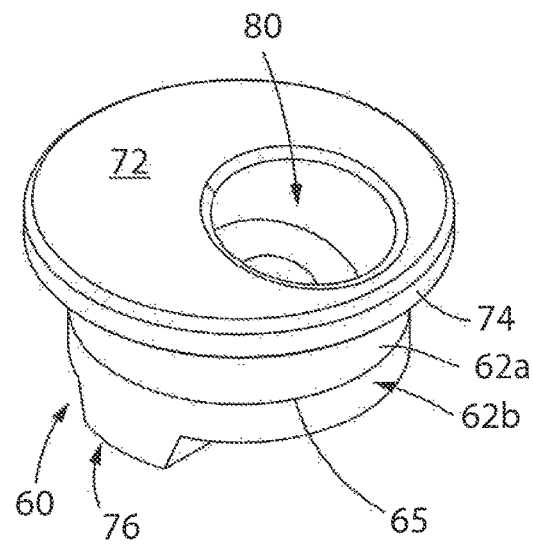
FIG. 5 is an isometric view of the cylindrical head of the mount of the present invention.
Figure 6:
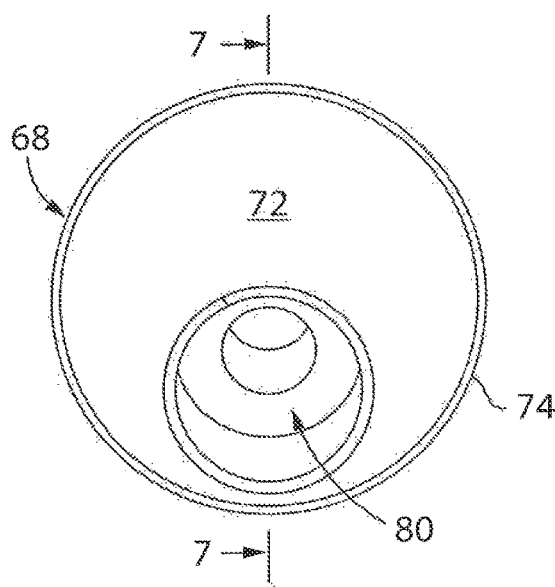
FIG. 6 is a top plan view of the cylindrical head of the mount of the present invention.
Figure 7:
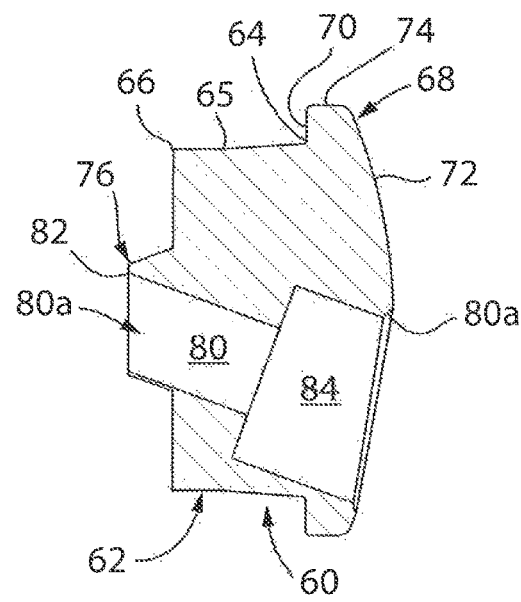
FIG. 7 is a cross-sectional view of the cylindrical head of the mount of the present invention taken along line 7-7 of FIG. 6.

As heretofore described, it is intended for mount 10 to interconnect plate 12 to a frame member 14 of a frame assembly. As best seen in FIGS. 4-7, mount 10 includes a cylindrical head 60 defined by outer surface 62 having first and second opposite ends 64 and 66, respectively. Outer surface 62 of cylindrical head includes a conical portion 62a extending from first end 64 thereof and a generally cylindrical portion 62b extending from second end 66. Conical portion 62a and cylindrical portion 62b extending along and are centered on common axis 67. Conical portion 62a and cylindrical portion 62b intersect at intersection 65. As best seen in FIG. 4, conical portion 62a tapers away from common axis 67 between intersection 65 and first end 64 of cylindrical head 60 at predetermined angle θ. By way of example, it is contemplated that predetermined angle θ be in the range of 1 degree and 7 degrees, and preferably, approximately 4 degrees. It is intended for the diameter D of cylindrical head 60 at intersection 65 to approximate the diameter of lower portion 17a of aperture 17 in plate 12 such that conical portion 62a of outer surface 62 of cylindrical head 60 frictionally engages circular wall 21 of plate 12 when urged therein. As best seen in FIGS. 3-4, outer surface 62 of cylindrical head 60 has an axial length L that is less than the thickness T of circular wall 21 of plate 12, for reasons hereinafter described.

Flange 68 extends radially from outer surface 62 of cylindrical head 60 at a location adjacent first end 64. Flange 68 includes lower surface 70 and a convex upper surface 72 spaced from each other by outer peripheral edge 74. It is contemplated for outer peripheral edge 74 of flange 68 to define a circle having a diameter greater than the diameter of lower portion 17a of aperture 17 defined by circular wall 21 in plate 12 so as to prevent the entirety of cylindrical head 60 from passing therethrough. Mounting rail 76 extends outwardly from second end 66 in a longitudinal direction and along a central portion thereof. Mounting rail 76 has a perimeter shape that corresponds to the portion of slot 32 that is defined between the first and second slot sidewalls 34 and 36. As such, it can be appreciated that the shape of mounting rail 76 allows mounting rail 76 to nest into the slot 32, between the slot sidewalls 34 and 36, for reasons hereinafter described.

Bolt-receiving bore 80 that extends angularly, in a transverse direction, through flange 68, cylindrical head 60 and through mounting rail 76. Bore 80 includes a first opening 80a communicating with upper surface 72 of flange 68 and a second end 80b communicating with lower surface 82 of mounting rail 76. Bore 80 defines a counter bore portion 84 adjacent first end 64 of cylindrical head 60 which is adapted for receiving bolt bead 86 of bolt 88, FIGS. 1-3, as hereinafter described. It is preferred that bore 80 extends through mount 10 at an acute angle with respect to first end 64 of cylindrical head 60 in the range of 1° and 89°, but preferably between about 30° and about 80°, and is most preferably about 70° but, regardless, is selected to align with a corresponding bore 120 of nut 90 which is described in greater detail below.

Referring back to FIGS. 1-3, in order to secure plate 12 to frame member 14 with mount 10, nut 90 is provided. Nut 90 is receivable within cavity 33 and is adapted for receiving terminal end 92 of bolt 88 extending through bore 80 in mount 10 so as to rigidly connect mount 10 to frame member 14. Nut 90 is sized to slide longitudinally through the cavity 33 and is intended to be captured within cavity 33 such that nut 90 does not rotate in unison with rotation of bolt 88. Nut 90 has a substantially planar upper wall 95 and a pair of outwardly tapering sidewalls 102 and 104 depending from opposite sides thereof. Tapering sidewalls 102 and 104 extend angularly from the upper wall 95 at angles that correspond to the angles of first and second outer abutment walls 42 and 44, respectively, between which the lower portion of the slot 32 is defined in frame member 14. A distance between the tapering sidewalls 102 and 104 is smaller than a distance between the first and second outer abutment walls 42 and 44, respectively, so that, during use, a clearance is defined between tapering sidewall 102 and first outer abutment wall 42 in a manner hereinafter described. A pair of shoulders 106 and 108 extend outwardly from lower portions of corresponding tapering sidewalls 102 and 104, respectively, and upwardly in a direction of the upper wall 95.

Shoulders 106 and 108 of nut 90 extend at corresponding angles that generally correspond to the angles defined between first and second inner abutment walls 46 and 48, respectively, and first and second outer abutments walls 42 and 44, respectively, of frame member 14. It is preferred that angles are obtuse angles, falling in the range of 91° and 179°, but preferably between about 95° and 105°, and is more preferably about 100°. Angles (not labeled) between shoulder 106 and the longitudinal axis of bore 120 through nut 90, and between shoulder 108 and the longitudinal axis of bore 120 are different. For example, the angle between shoulder 106 and the longitudinal axis of bore 120 is about 90°, and the angle between shoulder 108 and the longitudinal axis of bore 120 is about 55°. A lower curved wall 110 extends along an arcuate path between and connects outer ends of the shoulders 106 and 108. The profile shape and radius of curvature of the lower curved wall 110 of the nut 90 correspond to those characteristics of the concave terminal wall 50 that define the lower periphery of the cavity 33 of frame member 14.

Bore 120 extends orthogonally through nut 90 in a longitudinal direction of the nut 90 and angularly in a transverse direction of the nut 90. Bore 120 extends at the same angle as bore 80 through cylindrical head 60 of mount 10, namely, transversely at an acute angle. The acute angle of bore 120 falls in the range of 1° and 89°, but is preferably between about 30° and about 80°, and is most preferably about 65° with respect to the upper wall 95 of the nut 90. In this configuration, bore 120 has an upper opening that is substantially at a centerline of the nut 90 and a lower opening that is offset from the centerline of nut 90, being positioned below the outwardly tapered sidewall 102.

In order to interconnect plate 12 to frame member 14, nut 90 is slid longitudinally into the cavity 33 of face 30a of frame member 14. Plate 12 is positioned on face 30a of frame member 14 such that aperture 17 thorough plate 12 is aligned with slot 32 in frame member 14 and with bore 120 through nut 90 received in cavity 33. Thereafter, cylindrical head 60 is inserted through lower portion 17a of aperture 17 defined by circular wall 21 in plate 12 such that mounting rail 76 at second end 66 of cylindrical head 60 nests into slot 32 in face 30a of frame member 14 between slot sidewalls 34 and 36. It can be appreciated that flange 68 of cylindrical head 60 has a diameter greater than the diameter of lower portion 17a of aperture 17 through plate 12 so as to retain plate 12 between lower surface 70 of flange 68 and frame member 14. Bolt 88 is inserted through bore 80 through cylindrical head 60 and is threaded into the threads of bore 120 through nut 90.

Still referring to FIG. 3, the tightening of bolt 88 into nut 90 provides multi-axial tightening mount 10 so as to clamp of flange 68 of cylindrical head 60, plate 12 and nut 90 together. Since the outer surface 62 of cylindrical head 60 has an axial length L less than the thickness T of circular wall 21 of plate 12, plate 12 may be transversely compressed between face 30a of frame member 14 lower surface 70 of flange 68. Tightening bolt 88 draws the nut 90 by advancing the nut 90 along the threads of bolt 88. This pulls nut 90 angularly up and across the cavity 33, toward the outer abutment wall 42 at the left-hand side, FIG. 3, of the slot 32. Shoulder 106 engages the inner abutment wall 46 of cavity 33 while the nut 90 is being drawn angularly up and across the cavity 33, which establishes a clearance between outer abutment wall 44 of frame member 14 and tapering sidewall 104. Such clearance provides enough space for nut 90 to pivot within the cavity 33. This is done by further tightening bolt 88 after shoulder 106 engages the inner abutment wall 46 so that further advancing nut 90 along bolt 88 pivots nut 90 about the inner land 42a between inner and outer abutment walls 46 and 42, respectively. Nut 90 then pivots about the inner land 42a until shoulder 108 engages the inner abutment wall 48 of cavity 33. When both shoulders 106 and 108 of the nut 90 engage corresponding first and second inner abutment walls 46 and 48, respectively, of frame member 14, further tightening of bolt 88 moves cylindrical head 60 closer to nut 90. This, in turn, urges first and second inner abutment walls 46 and 48, respectively, closer to each other, transversely compressing frame member 14 because of the wedging action between first and second inner abutment walls 46 and 48, respectively, and corresponding shoulders 106 and 108 such that first and second inner abutment walls 46 and 48, respectively, slide across shoulders 106 and 108, respectively, and toward tapering sidewalls 102 and 104 of the nut 90.

In addition, as flange 68 is urged with cylindrical head 60 toward frame member 14, gap 132 between second side 66 of cylindrical head 60 and face 30a of frame member 14 allows for a clamping force to be exerted on plate 12 between flange 168 of cylindrical head 60 and frame member 14. The clamping force is exerted on plate 12 prevents rotational movement of plate 12 relative to frame member 14 (and mount 10). Further, as bolt 88 is tightened into nut 90, conical portion 62a of outer surface 62 of cylindrical head 60 is urged into frictional engagement with circular sidewall 21 defining lower portion 17a of aperture 17 through plate 12. It is intended for conical portion 62a of outer surface 62 of cylindrical head 60 to frictionally retain plate 12 in position so as to prevent rotational movement of plate 12 relative to frame member 14.

Referring to FIGS. 8-11, an alternate embodiment of a mount in accordance with the present invention is generally designated by the reference number 150. Mount 150 is intended to interconnect first and second frame members 14a and 14b, respectively. First and second frame members 14a and 14b, respectively, are identical in structure to frame member 14, as heretofore described. As such, the prior description of frame member 14 is understood to describe first and second frame members 14a and 14b, respectively, as if fully described herein.

Mount 150 includes a first corner generally designated by the reference numeral 152. First corner 152 includes an L-shaped body defined by horizontal plate 154 and an upright or vertical plate 156. Horizontal plate 154 defines a substantially flat outer face 158, an arcuate inner face 160, first and second sides 162 and 164, respectively, and an arcuate terminal edge 166. Horizontal plate 154 further includes aperture 168 extending therethrough between outer face 158 and inner face 160 along an axis 169 generally perpendicular outer face 158. Aperture 168 includes a first, reduced diameter portion 170 having a diameter of sufficient dimension to allow for outer surface 62 of cylindrical head 60 to pass therethrough and an enlarged diameter portion 172 having a diameter of sufficient dimension to allow for flange 68, extending radially from outer surface 62 of cylindrical head 60, to be received therein. Reduced diameter portion 170 and enlarged diameter portion 172 of aperture 168 are defined by corresponding, generally cylindrical surfaces 174 and 176, respectively. Cylindrical surfaces 174 and 176, respectively, are interconnect by shoulder 178 lying in a plane generally parallel to outer face 158.

Vertical plate 1156 defines a substantially flat outer face 180 which is generally perpendicular to outer face 158 of horizontal plate 154, an arcuate inner face 182, first and second sides 184 and 186, respectively, and an arcuate terminal edge 187 extending between first and second sides 184 and 186, respectively. Outer face 180 of vertical plate 156 intersects outer face 158 of horizontal plate 154 at edge 188. Inner face 182 of vertical plate 156 intersects inner face 160 of horizontal plate 154 so as to form a generally convex inner surface 190. First side 184 of vertical plate 156 is coincident with first side 162 of horizontal plate 154 so to form a generally planar first side surface 192. Similarly, second side 186 of vertical plate 156 is coincident with second side 164 of horizontal plate 154 so to form a generally planar second side surface 194.

Vertical plate 156 further includes aperture 196 extending therethrough between outer face 180 and inner face 182 along an axis generally perpendicular outer face 180. Aperture 196 includes a first, reduced diameter portion 200 having a diameter of sufficient dimension to allow for outer surface 62 of cylindrical head 60 to pass therethrough and an enlarged diameter portion 202 having a diameter of sufficient dimension to allow for flange 68, extending radially from outer surface 62 of cylindrical head 60, to be received therein. Reduced diameter portion 200 and enlarged diameter portion 202 of aperture 196 are defined by corresponding, generally cylindrical surfaces 204 and 206, respectively. Cylindrical surfaces 204 and 206, respectively, are interconnected by shoulder 208 lying in a plane generally perpendicular to axis 198 and generally parallel to outer face 180 of vertical plate 156.

In order to interconnect first and second frame members 14a and 14b, nuts 90a and 90b are slid longitudinally into corresponding cavities 33 of faces 30a of first and second frame members 14a and 14b, respectively. Nuts 90a and 90b are identical in structure to nut 90, as heretofore described. As such, the prior description of nut 90 is understood to describe nuts 90a and 90b, as if fully described herein. First corner 152 is positioned on face 30a of first frame member 14a such that aperture 196 thorough vertical plate 156 is aligned with slot 32 in frame member 14a and with bore 120 through nut 90a received in cavity 33. Thereafter, cylindrical head 60 is inserted through aperture 196 in vertical plate 156 such that mounting rail 76 at second end 66 of cylindrical head 60 nests into slot 32 in face 30a of first frame member 14a between slot sidewalls 34 and 36. It can be appreciated that flange 68 of cylindrical head 60 has a diameter greater than the diameter of reduced diameter portion 200 of aperture 196 in plate 12 so as retain shoulder 208 of vertical plate 156 between flange 68 of cylindrical head 60 and first frame member 14a. Bolt 88 is inserted through bore 80 through cylindrical head 60 and is threaded into the threads of bore 120 through nut 90a.

Figure 11:
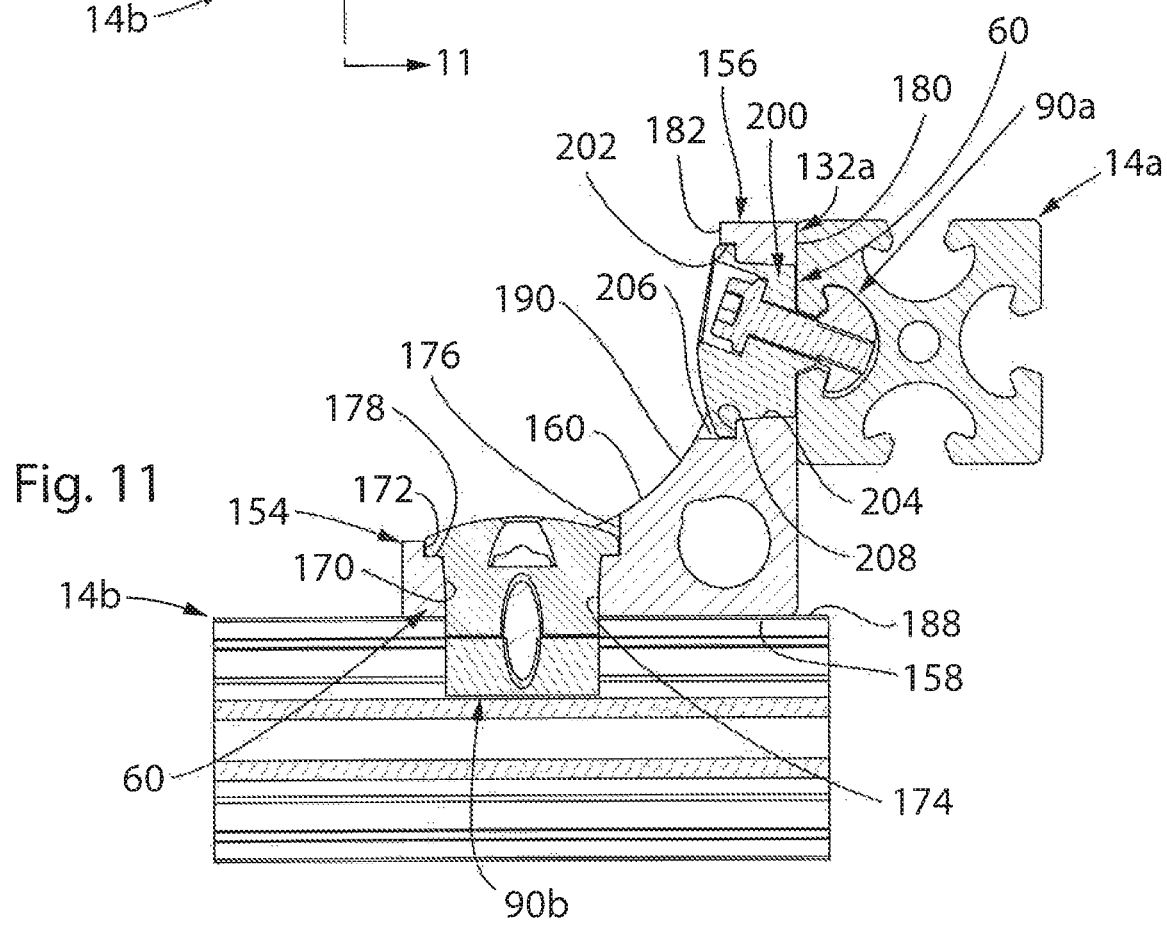
FIG. 11 is a cross-sectional view of the mount of the present invention taken along line 11-11 of FIG. 10.
Figure 12:
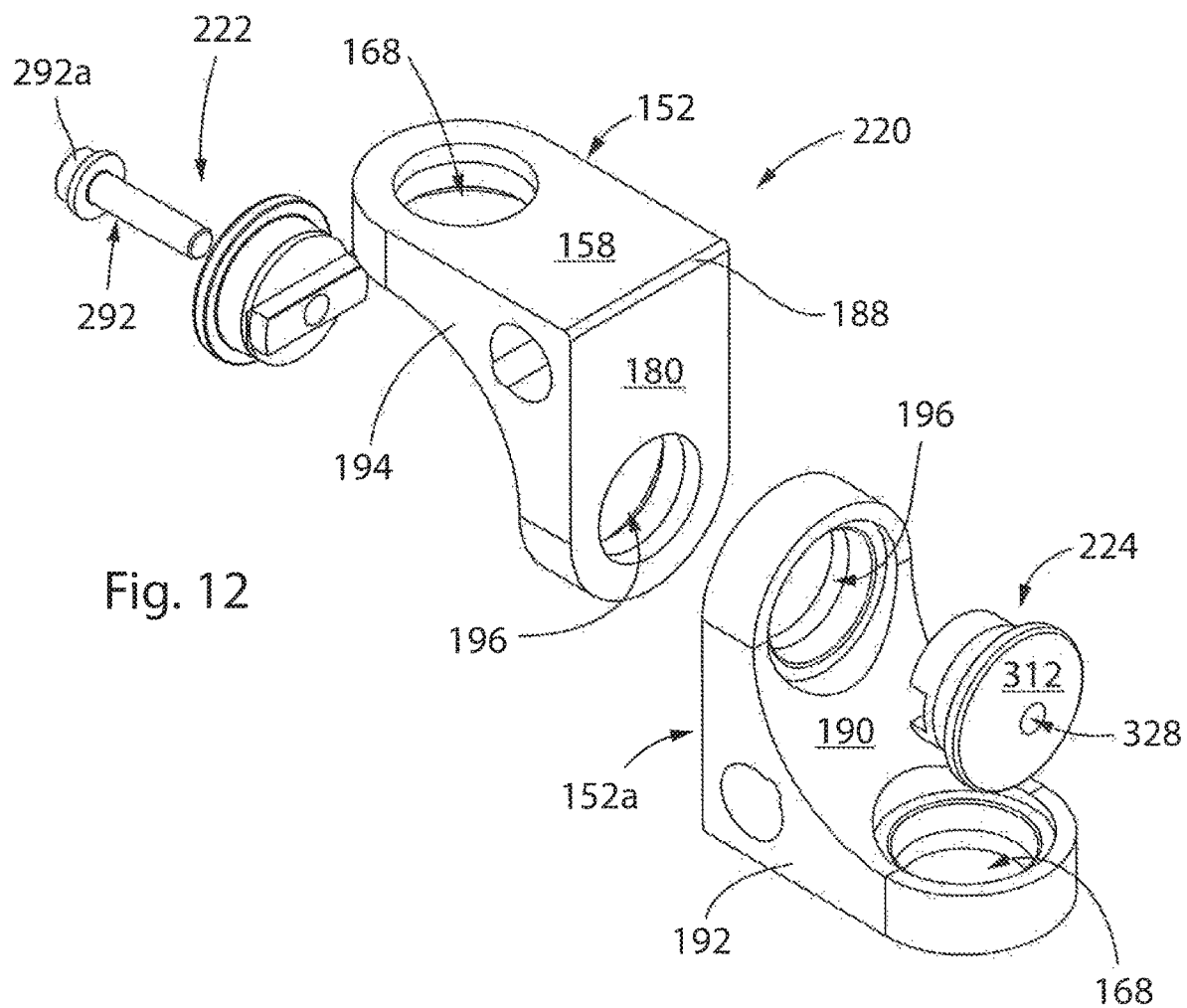
FIG. 12 is an exploded, isometric view of a still further alternate embodiment of a mount in accordance with the present invention for interconnecting first and second frame members to each other at a user desired angle.
Figure 13:
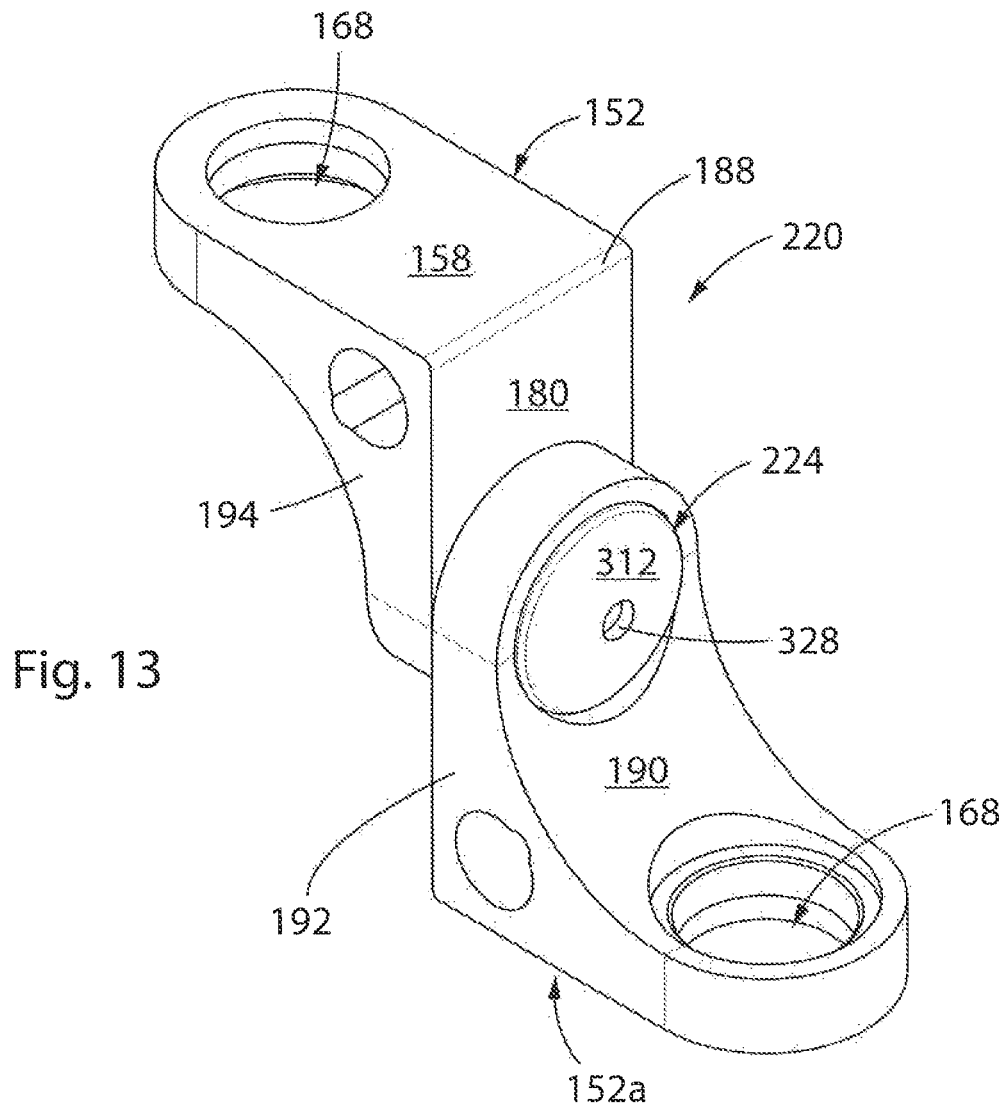
FIG. 13 is an isometric view of the mount of FIG. 12 in an assembled configuration.
Figure 14:
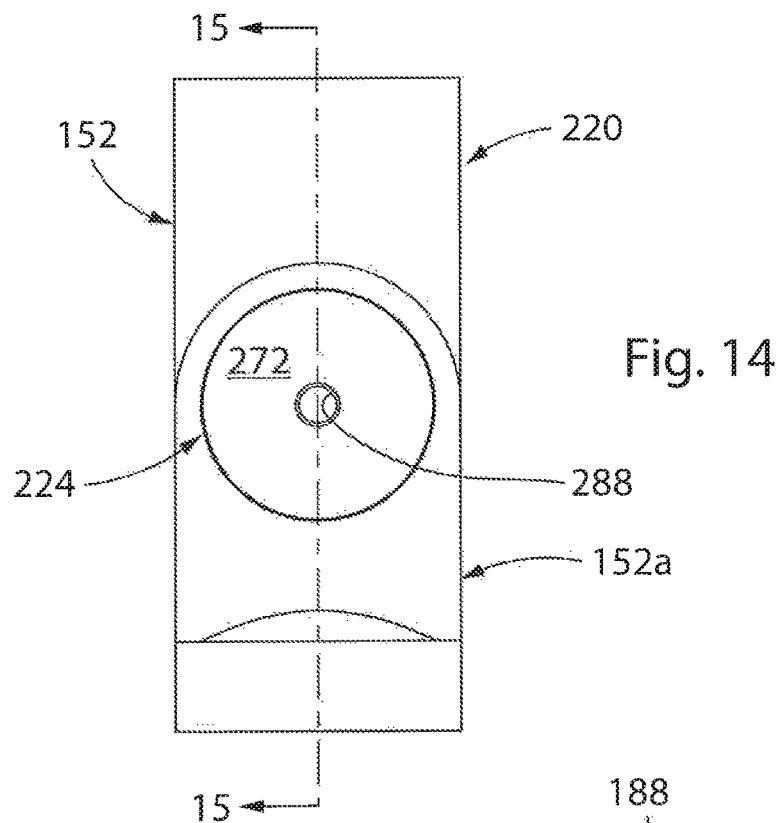
FIG. 14 is an end view of the mount of FIG. 13.
Figure 15:
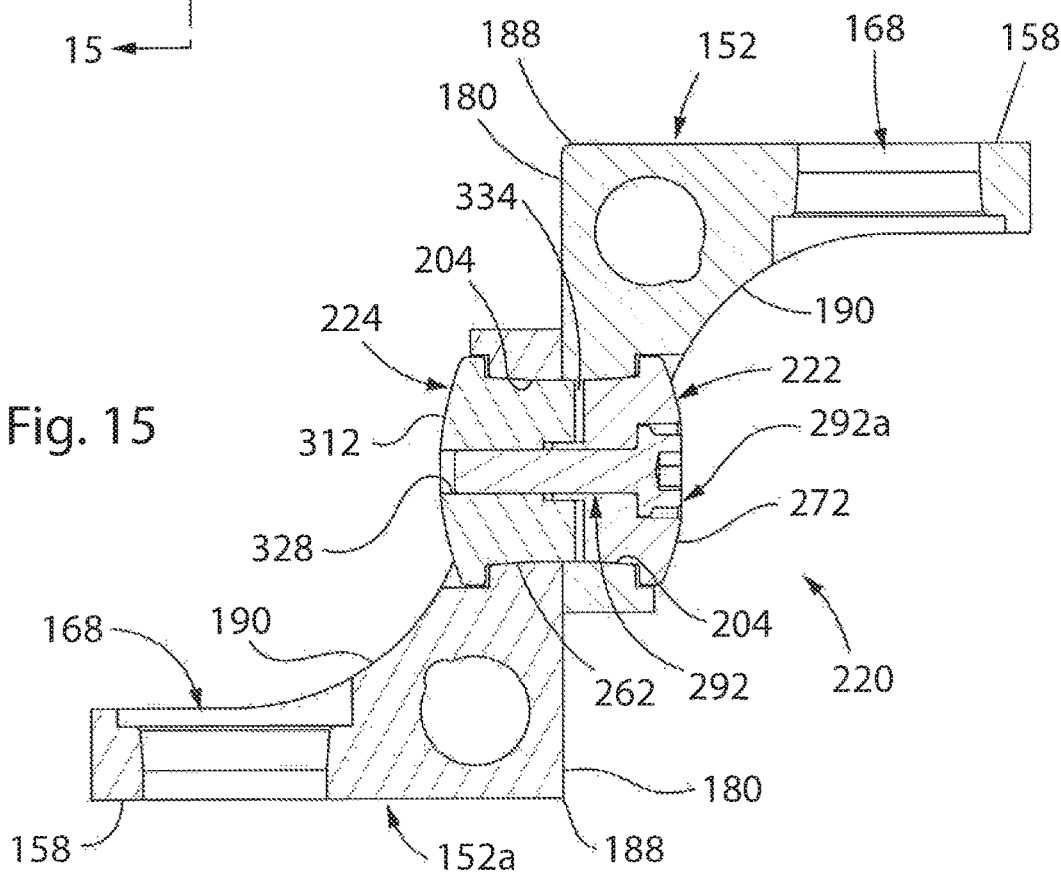
FIG. 15 is a cross-sectional view of the mount of the present invention taken along line 15-15 of FIG. 14.
Figure 16:
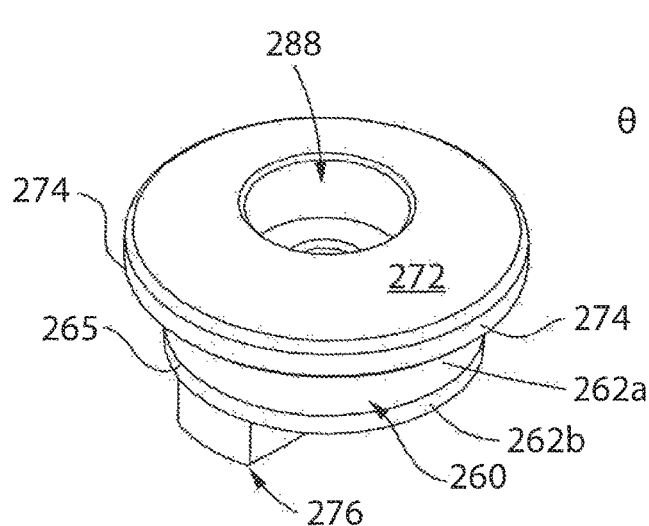
FIG. 16 is an isometric view of a first cylindrical head of the mount of FIG. 13.

Referring to FIG. 11, the tightening of bolt 88 into nut 90a provides multi-axial tightening of mount 150 so as to clamp the stack of flange 68 of cylindrical head 60, vertical plate 156 and nut 90a together. Since the outer surface 62 of cylindrical head 60 has an axial length L less than the thickness of cylindrical surface 204 defining reduced diameter portion 200 of aperture 196, shoulder 208 (and hence, vertical plate 156) may be transversely compressed between face 30a of first frame member 14a and lower surface 70 of flange 68. Tightening bolt 88 draws the nut 90a by advancing the nut 90 along the threads of bolt 88. This pulls nut 90a angularly up and across the cavity 33, toward the outer abutment wall 42 of the slot 32. Shoulder 106 engages the inner abutment wall 46 of cavity 33 while the nut 90a is being drawn angularly up and across the cavity 33, which establishes a clearance between outer abutment wall 44 of frame member 14a and tapering sidewall 104. Such clearance provides enough space for nut 90a to pivot within the cavity 33. This is done by further tightening bolt 88 after shoulder 106 engages the inner abutment wall 46 so that further advancing nut 90 along bolt 88 pivots nut 90 about the inner land 42a between inner and outer abutment walls 46 and 42, respectively. Nut 90a then pivots about the inner land 42a until shoulder 108 engages the inner abutment wall 48 of cavity 33. When both shoulders 106 and 108 of the nut 90a engage corresponding first and second inner abutment walls 46 and 48, respectively, of first frame member 14a, further tightening of bolt 88 moves cylindrical head 60 closer to nut 90. This, in turn, urges first and second inner abutment walls 46 and 48, respectively, closer to each other, transversely compressing frame member 14a because of the wedging action between first and second inner abutment walls 46 and 48, respectively, and corresponding shoulders 106 and 108 such that first and second inner abutment walls 46 and 48, respectively, slide across shoulders 106 and 108, respectively, and toward tapering sidewalls 102 and 104 of nut 90a.

In addition, as noted above, as flange 68 is urged with cylindrical head 60 toward first frame member 14a, gap 132a between second side 66 of cylindrical head 60 and face 30a of first frame member 14a allows for a clamping force to be exerted on shoulder 208 of vertical plate 156 between flange 168 of cylindrical head 60 and first frame member 14a. The clamping force is exerted on shoulder 208 of vertical plate 156 prevents rotational movement of vertical plate 156 relative to first frame member 14a. Further, as bolt 88 is tightened into nut 90a, conical portion 62a of outer surface 62 of cylindrical head 60 is urged into frictional engagement with cylindrical surface 204 defining reduced diameter portion 200 of aperture 196 through vertical plate 156. It is intended for conical portion 62a of outer surface 62 of cylindrical head 60 to frictional retain vertical plate 156 in position so as to prevent rotational movement of vertical plate 156 relative to first frame member 14a.

In a similar matter, second frame member 14b is positioned relative to first corner 152 such that face 30a of second frame member 14b is adjacent outer face 158 of horizontal plate 154 and such that aperture 168 thorough horizontal plate 154 is aligned with slot 32 in second frame member 14b and with bore 120 through nut 90b received in cavity 33. Thereafter, a second cylindrical head 60 is inserted through aperture 168 in horizontal plate 154 such that mounting rail 76 at second end 66 of cylindrical head 60 nests into slot 32 in face 30a of second frame member 14b between slot sidewalls 34 and 36. It can be appreciated that flange 68 of cylindrical head 60 has a diameter greater than the diameter of reduced diameter portion 170 of aperture 168 in horizontal plate 154 so as retain shoulder 178 of horizontal plate 154 between flange 68 of cylindrical head 60 and second frame member 14b. Bolt 88 is inserted through bore 80 through cylindrical head 60 and is threaded into the threads of bore 120 through nut 90b.

Figure 8:
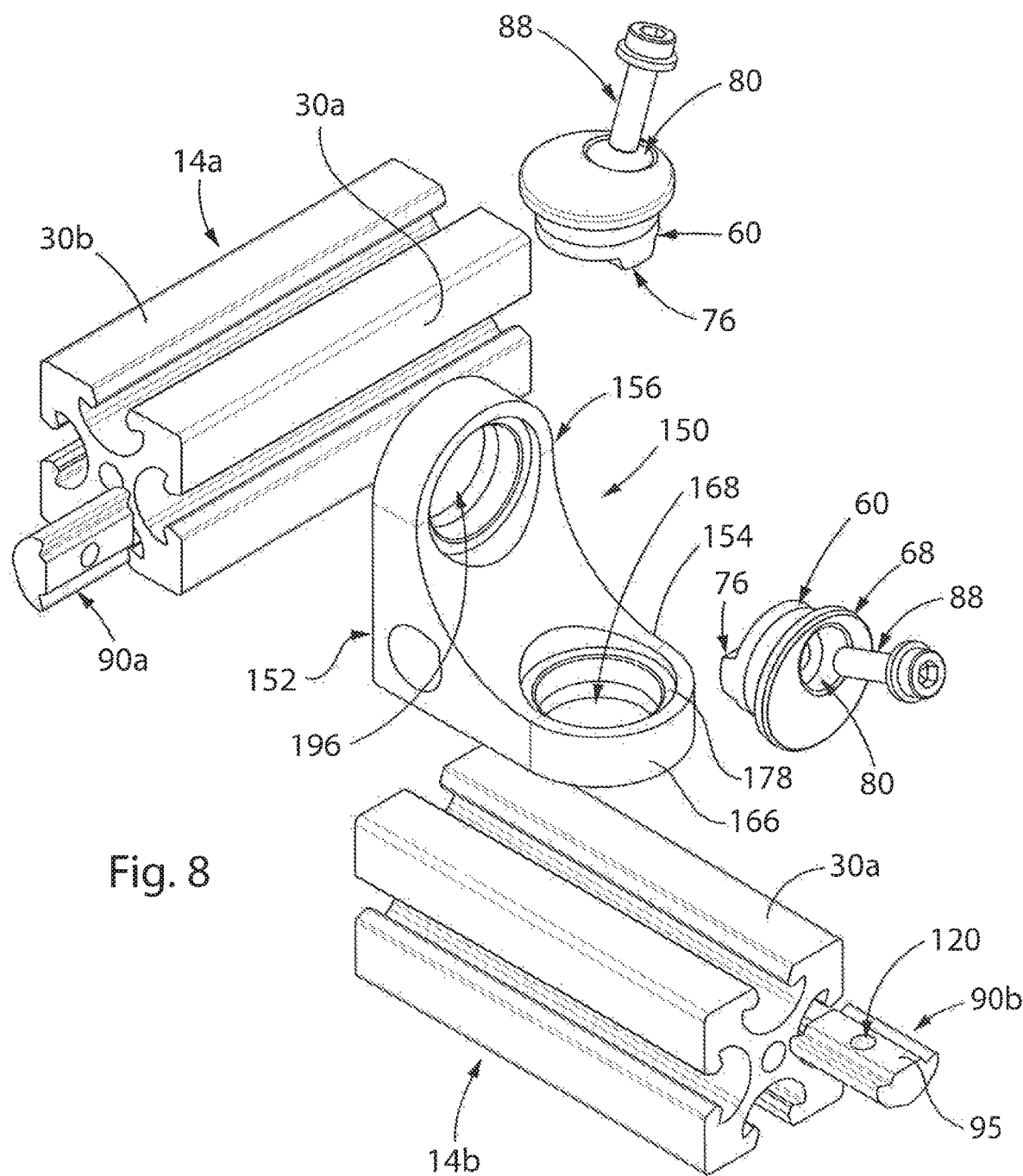
FIG. 8 is an exploded, isometric view of an alternate embodiment mount in accordance with the present invention for interconnecting first and second frame members.
Figure 9:
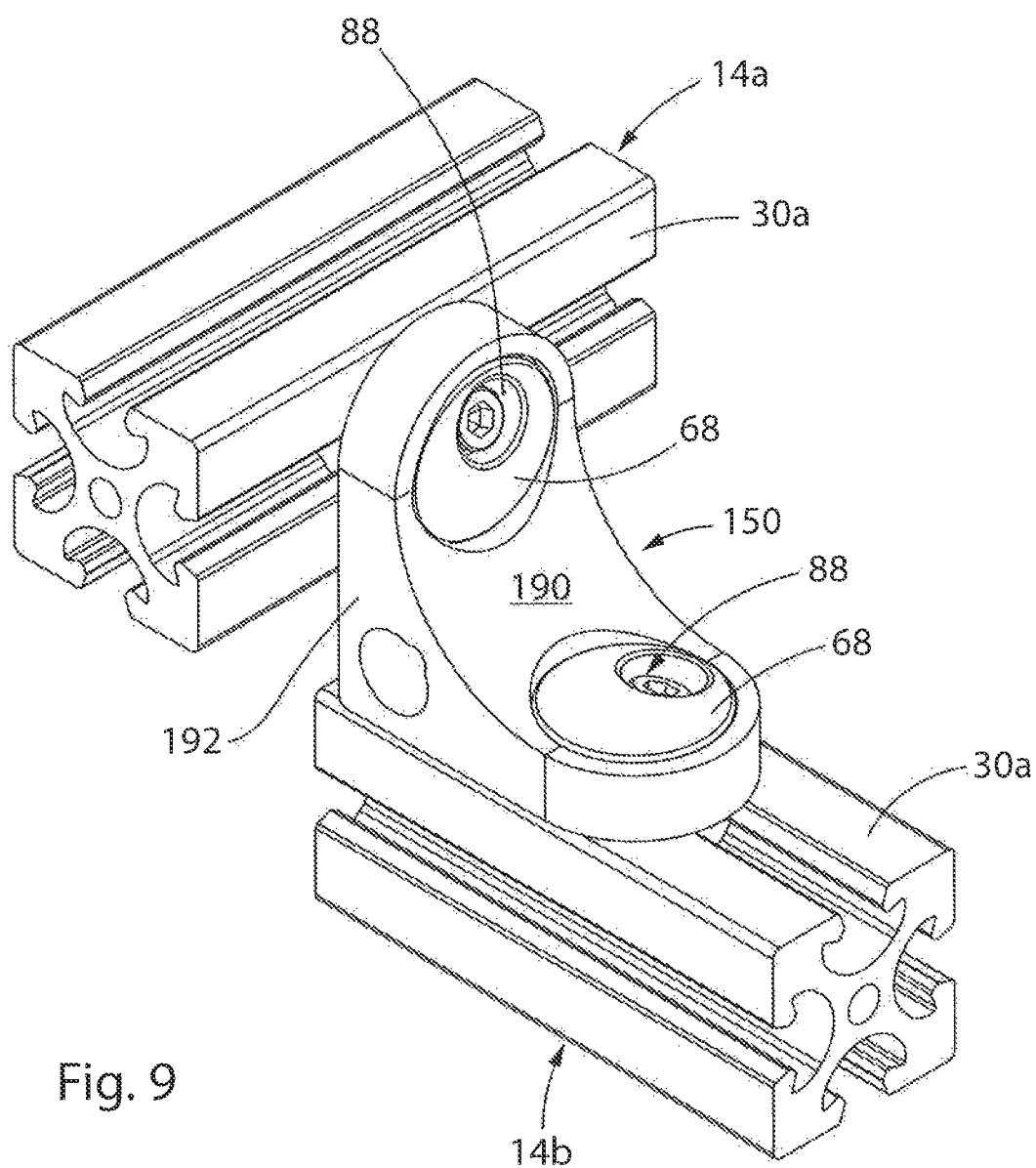
FIG. 9 is an isometric view of the mount of present invention interconnecting the first and second frame members.
Figure 10:
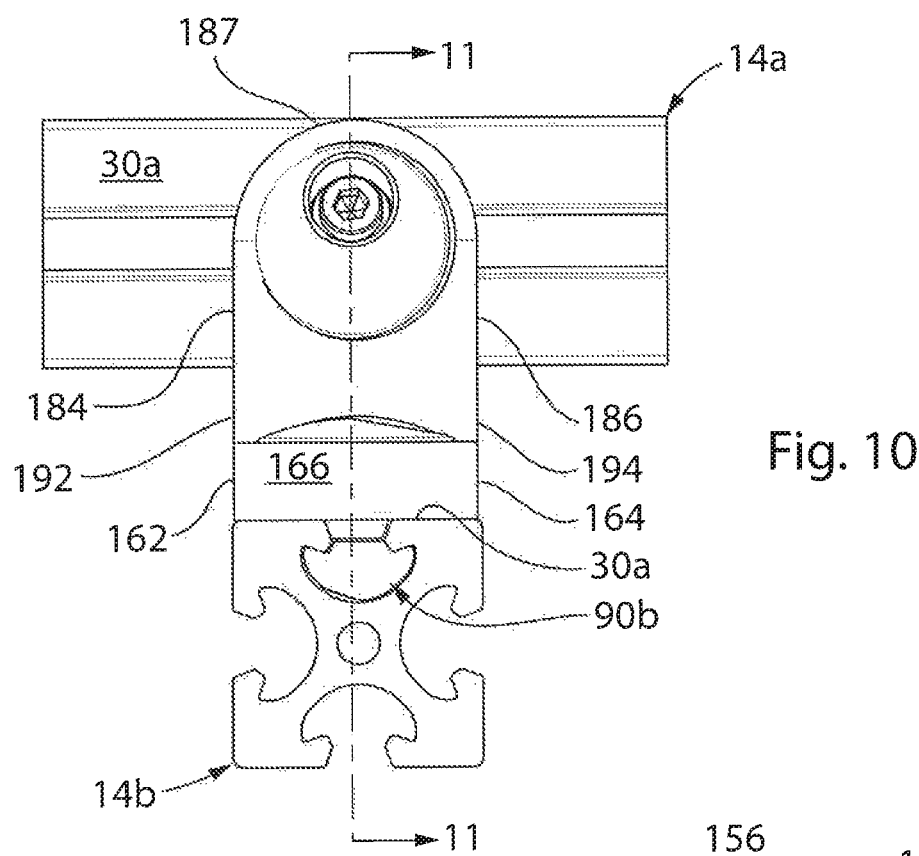
FIG. 10 is an end view of the mount of present invention interconnecting the first and second frame members.

Still referring to FIGS. 8 and 11, the tightening of bolt 88 into nut 90b provides multi-axial tightening of mount 150 so as to clamp the stack of flange 68 of cylindrical head 60, horizontal plate 154 and nut 90b together. Since the outer surface 62 of cylindrical head 60 has an axial length L less than the thickness of cylindrical surface 174 defining reduced diameter portion 170 of aperture 168, shoulder 178 (and hence, horizontal plate 154) may be transversely compressed between face 30a of second frame member 14b and lower surface 70 of flange 68. Tightening bolt 88 draws the nut 90b by advancing the nut 90b along the threads of bolt 88. This pulls nut 90b angularly up and across the cavity 33, toward the outer abutment wall 42 of the slot 32. Shoulder 106 engages the inner abutment wall 46 of cavity 33 while the nut 90b is being drawn angularly up and across the cavity 33, which establishes a clearance between outer abutment wall 44 of second frame member 14b and tapering sidewall 104. Such clearance provides enough space for nut 90b to pivot within the cavity 33. This is done by further tightening bolt 88 after shoulder 106 engages the inner abutment wall 46 so that further advancing nut 90b along bolt 88 pivots nut 90b about the inner land 42a between inner and outer abutment walls 46 and 42, respectively. Nut 90b then pivots about the inner land 42a until shoulder 108 engages the inner abutment wall 48 of cavity 33. When both shoulders 106 and 108 of the nut 90b engage corresponding first and second inner abutment walls 46 and 48, respectively, of second frame member 14b, further tightening of bolt 88 moves cylindrical head 60 closer to nut 90b. This, in turn, urges first and second inner abutment walls 46 and 48, respectively, closer to each other, transversely compressing second frame member 14b because of the wedging action between first and second inner abutment walls 46 and 48, respectively, and corresponding shoulders 106 and 108 such that first and second inner abutment walls 46 and 48, respectively, slide across shoulders 106 and 108, respectively, and toward tapering sidewalls 102 and 104 of nut 90b.

In addition, as flange 68 is urged with cylindrical head 60 toward second frame member 14b, a gap (not shown) between second side 66 of cylindrical head 60 and face 30a of second frame member 14b allows for a clamping force to be exerted on shoulder 178 of horizontal plate 154 between flange 168 of cylindrical head 60 and second frame member 14b. The clamping force is exerted on shoulder 178 of horizontal plate 154 prevents rotational movement of horizontal plate 154 relative to second frame member 14b. Further, as bolt 88 is tightened into nut 90b, conical portion 62a of outer surface 62 of cylindrical head 60 is urged into frictional engagement with cylindrical surface 174 defining reduced diameter portion 170 of aperture 168 through horizontal plate 154. It is intended for conical portion 62a of outer surface 62 of cylindrical head 60 to frictionally retain horizontal plate 154 in position so as to prevent rotational movement of horizontal plate 154 relative to second frame member 14b. As described, mount 150 securely retains first and second frame members 14a and 14b, respectively, perpendicular to each other, FIG. 9.

Figure 17:
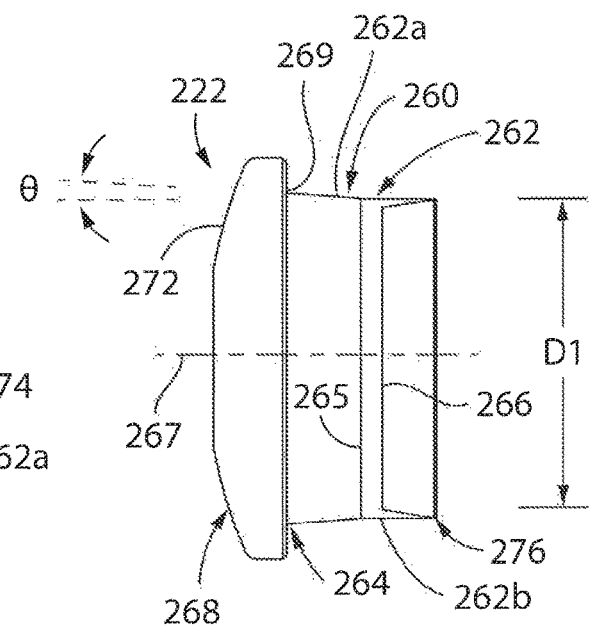
FIG. 17 is a side elevational view of the first cylindrical head of FIG. 16.
Figure 19:
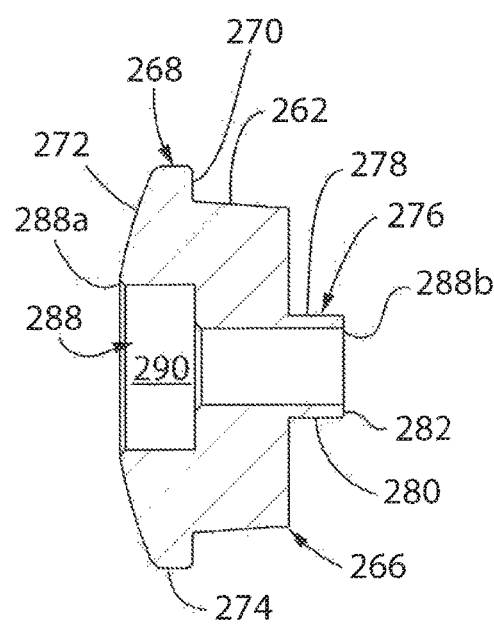
FIG. 19 is a cross-sectional view of the first cylindrical head of the mount of the present invention taken along line 19-19 of FIG. 18.
Figure 18:
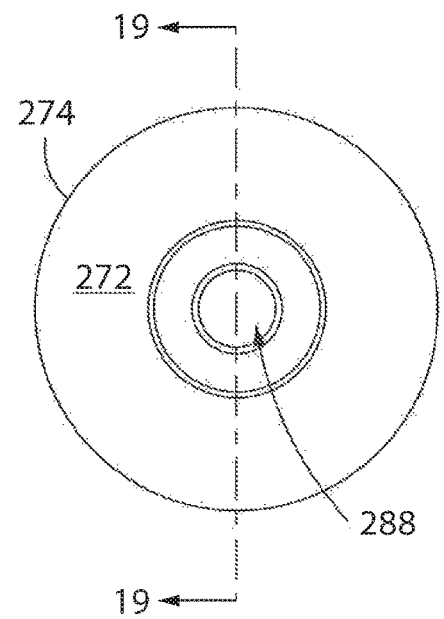
FIG. 18 is a top plan view of the first cylindrical head of FIG. 16.

Referring to FIGS. 12-23, a still further embodiment of a mount in accordance with the present invention is generally designated by the reference numeral 220. Mount 220 includes first and second corners 152 and 152a, respectively, which are identical in structure. As such, the prior description of first corner 152 is understood to describe second corner 152a, as if fully described herein. Mount 220 further includes first and second locking elements 222 and 224, respectively. First locking element 222 includes a cylindrical head 260 defined by outer surface 262 having first and second opposite ends 264 and 266, respectively. Outer surface 262 of cylindrical head includes a conical portion 262a extending from first end 264 thereof and a generally cylindrical portion 262b extending from second end 264. Conical portion 262a and cylindrical portion 262b extending along and are centered on common axis 267. Conical portion 262a and cylindrical portion 262b intersect at intersection 265. As best seen in FIG. 17, conical portion 262a tapers away from common axis 267 between intersection 265 and first end 264 of cylindrical head 260 at predetermined angle θ. By way of example, it is contemplated that predetermined angle θ be in the range of 1 degree and 7 degrees, and preferably, approximately 4 degrees. It is intended for the diameter D1 of cylindrical head 260 at intersection 265 of outer surface 262 of cylindrical head 260 to approximate the diameter of reduced diameter portion 200 of aperture 196 in vertical plate 156 so as to allow conical portion 262a of outer surface 262 of cylindrical head 260 to frictionally engage cylindrical surface 204 of vertical plate 156 of first corner 152.

First locking element 222 further includes flange 268 extends radially from outer surface 262 of cylindrical head 260 at a location adjacent first end 264 thereof. Flange 268 includes lower surface 270 and chamfered upper surface 272 spaced from each other by outer peripheral edge 274. It is contemplated for outer peripheral edge 274 of flange 268 to define a circle having a diameter less than the diameter of enlarged diameter portion 202 of aperture 196 in vertical plate 156 so as to allow flange 268 to be received therein and greater than the diameter of reduced diameter portion 200 of aperture 196 in vertical plate 156 so as to prevent the entirety of cylindrical head 260 from passing therethrough. Key 276 extends outwardly from second end 266 in a longitudinal direction and along a central portion thereof. More specifically, key 276 has first and second, generally parallel sidewalls 278 and 280, respectively, extending from second end 266 cylindrical head 260. First and second, sidewalls 278 and 280, respectively, are interconnected by end wall 282 which is generally perpendicular thereto. As such, it can be appreciated that the shape of key 276 corresponds in size and shape to slot 284 in second locking element 224, as hereinafter described, so as to allow key 276 to nest into the slot 284. Bolt-receiving bore 288 that extends axially through cylindrical head 260 and key 276. Bore 288 includes a first opening 288a communicating with surface 272 of flange 268 and a second end 288b communicating with end wall 282 of key 76. Bore 288 defines a counter bore portion 290 adjacent first end 264 of cylindrical head 260 which is adapted for receiving either bolt head 292a of bolt 292, as hereinafter described.

Figure 21:
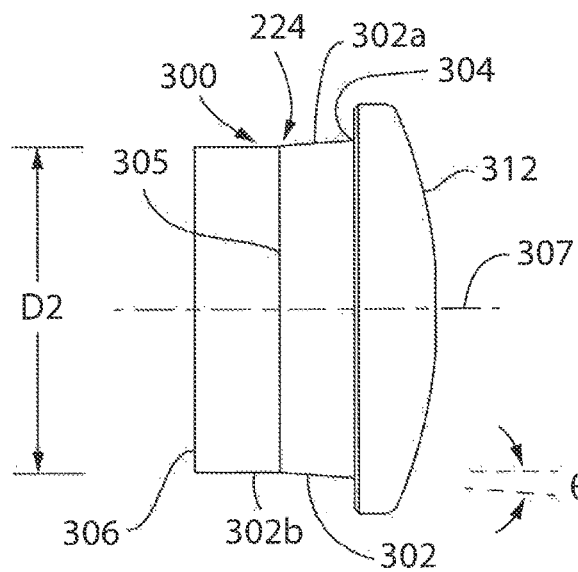
FIG. 21 is a side elevational view of the second cylindrical head of FIG. 20.
Figure 20:
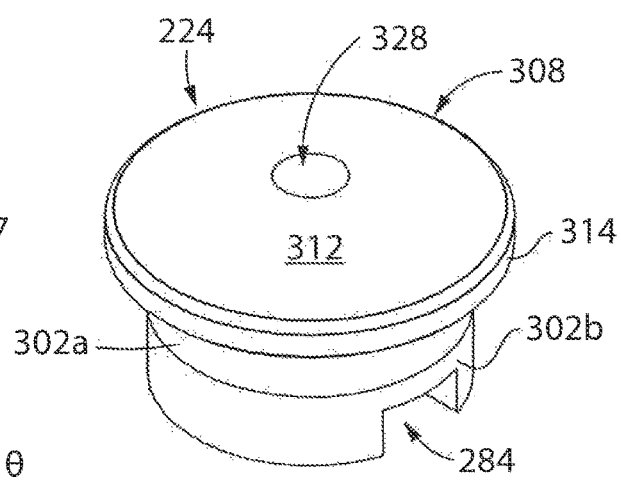
FIG. 20 is an isometric view of a second cylindrical head of the mount of FIG. 13.
Figure 22:
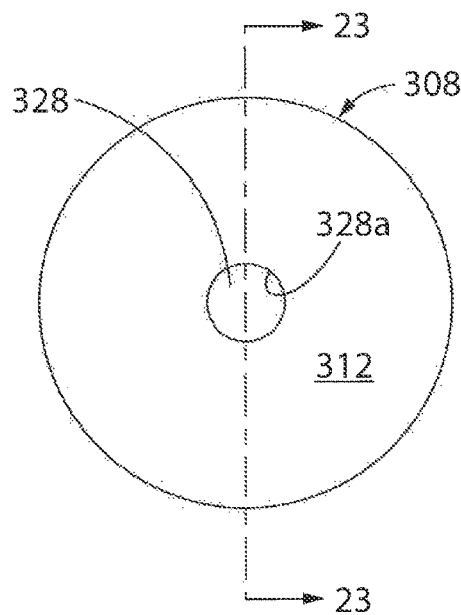
FIG. 22 is a top plan view of the second cylindrical head of FIG. 20.
Figure 23:
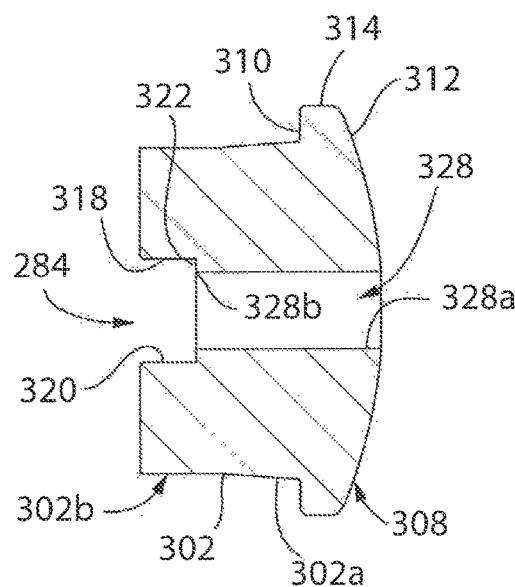
FIG. 23 is a cross-sectional view of the second cylindrical head of the mount of the present invention taken along line 23-23 of FIG. 22.

Referring to FIGS. 20-23, second locking element 224 includes a cylindrical head 300 defined by outer surface 302 having first and second opposite ends 304 and 306, respectively. Outer surface 302 of cylindrical head 300 includes a conical portion 302a extending from first end 304 thereof and a generally cylindrical portion 302b extending from second end 304. Conical portion 302a and cylindrical portion 302b extending along and are centered on common axis 307. Conical portion 302a and cylindrical portion 302b intersect at intersection 305. As best seen in FIGS. 21-23, conical portion 302a tapers away from common axis 307 between intersection 305 and first end 304 of cylindrical bead 300 at predetermined angle θ. By way of example, it is contemplated that predetermined angle θ be in the range of 1 degree and 7 degrees, and preferably, approximately 4 degrees. It is intended for the diameter D2 of cylindrical head 300 at the intersection of conical portion 302a and first end 304 of cylindrical head 300 to approximate the diameter of reduced diameter portion 200 of aperture 196 in vertical plate 156 so as to allow conical portion 302a of outer surface 302 of cylindrical head 300 to frictionally engage cylindrical surface 204 of vertical plate 156 of second corner 152a.

Second locking element 224 further includes flange 308 extends radially from outer surface 302 of cylindrical head 300 at a location adjacent first end 304 thereof. Flange 308 includes lower surface 310 and chamfered upper surface 312 spaced from each other by outer peripheral edge 314. It is contemplated for outer peripheral edge 314 of flange 308 to define a circle having a diameter less than the diameter of enlarged diameter portion 202 of aperture 196 in vertical plate 156 so as to allow flange 308 to be received therein and greater than the diameter of reduced diameter portion 200 of aperture 196 in vertical plate 156 so as to prevent the entirety of cylindrical head 300 from passing therethrough. Slot 284 is provided in second end 306 in a longitudinal direction and along a central portion thereof. More specifically, slot 284 is defined by first and second, generally parallel sidewalls 318 and 320, respectively, extending from second end 306 cylindrical head 300. First and second, sidewalls 318 and 320, respectively, are interconnected by recessed wall 322 which is generally perpendicular thereto. As such, it can be appreciated that the shape of slot 284 corresponds in size and shape to key 276 in first locking element 222, as hereinafter described, so as to allow key 276 to nest in slot 284. Threaded bolt-receiving bore 328 that extends axially through cylindrical head 300. Threaded bore 328 includes a first opening 328a communicating with surface 312 of flange 308 and a second opening 328b communicating with recessed wall 322 within slot 284.

In operation, in order to interconnect first and second frame members 14a and 14b respectively, in a desired position, horizontal plate 154 of second corner 152a is interconnected to first frame member 14a utilizing a first cylindrical head 60 in aperture 168, in the manner heretofore described. Similarly, horizontal plate 154 of second corner 152 is interconnected to second frame member 14b utilizing a second cylindrical head 60 in aperture 168 in horizontal plate 154 of second corner 152a, in the manner heretofore described. Thereafter, first corner 152 is positioned adjacent second corner 152a such that aperture 196 in vertical plate 156 of first corner 152 is axially aligned with aperture 196 in vertical plate 156 of second corner 152a. Cylindrical head 260 of first locking element 222 is inserted into aperture 196 in vertical plate 156 of first corner 152 such that outer surface 262 of cylindrical head 260 is received in reduced diameter portion 200 of aperture 196 and frictionally engages cylindrical surface 204 of first corner 152 and such that flange 268 of cylindrical head 260 is received in enlarged diameter portion 202 of aperture 196 in vertical plate 156 of first corner 152. Similarly, cylindrical head 300 of second locking element 224 is inserted into aperture 196 in vertical plate 156 of second corner 152a such that outer surface 302 of cylindrical head 300 is received in reduced diameter portion 200 of aperture 196 and frictionally engages cylindrical surface 204 second corner 152a and such that flange 308 of cylindrical head 300 is received in enlarged diameter portion 202 of aperture 196 in vertical plate 156 of first corner 152. In addition, slot 284 in second end 306 of cylindrical head 300 is aligned with and receives key 276 of first locking element 222, FIG. 15. Bolt 292 is inserted through bolt-receiving bore 288 that extends axially through cylindrical head 260 and key 276 of first locking element 222 and threaded into threaded bolt-receiving bore 328 in cylindrical head 300.

With first and second locking elements 224 and 224, respectively, interconnected by bolt 292, first corner 152 (and hence, first frame member 14) may be pivoted with respected to second corner 152a (and hence, second frame member 14a) on outer surface 262 of cylindrical head 260 and outer surface 302 of cylindrical head 300 to a desired position. With first and second corners 152 and 152a in the desired position, bolt 292 is tightened into threaded bolt-receiving bore 328 in cylindrical head 300 such that bolt head 292a is received in counter bore portion 290 of bore 288 in first locking element 224, thereby capturing vertical plates 156 of first and second corners 152 and 152a, respectively, between flanges 268 and 308 of first and second locking elements 224 and 224, respectively. It is contemplated for the combined axial length of outer surface 262 of cylindrical head 260 and outer surface 302 of cylindrical head 300 to be less than the combined thickness cylindrical surfaces 204 of first and second corners 152 and 152a such that gap 334 is provided between second ends 266 and 306 of outer surfaces 262 and 302, respectively, of cylindrical heads 260 and 300, respectively, of first and second locking elements 222 and 224, respectively. Gap 334 allows for shoulders 208 (and hence, vertical plates 156) of first and second corners 152 and 152a, respectively, to be transversely compressed between lower surface 269 of flange 268 of first locking element 222 and lower surface 310 of flange 308 of second locking element 224, thereby fixing the first and second corners 152 and 152a, respectively, (and hence, first and second frame members 14 and 14a, respectively) in the desired position.

Various modes of carrying out the invention are contemplated as being within the scope of the following claims particularly pointing out and distinctly claiming the subject matter, which is regarded as the invention.

The invention claimed is:

1. A mount for mounting a plate to a frame assembly, comprising:
   a generally cylindrical head extending along a head axis, being receivable in an aperture in the plate and having an upper portion, an upper surface, a lower face, an outer peripheral surface, a rail structure extending from the lower face and receivable in a slot of a frame member of the frame assembly, and a bolt-receiving bore extending through the cylindrical head along a bore axis at an acute angle to the head axis, the outer peripheral surface of the cylindrical head including a tapered portion and the rail structure including first and second sidewalls that diverge from each other as the first and second sidewalls walls extend away from the lower face of the cylindrical head toward the upper portion of cylindrical head; and
   a flange extending radially extending from the outer peripheral surface of the cylindrical head, the flange having a diameter.

2. The mount of claim 1 wherein the first and second sidewalls of the rail structure intersect the lower face of the cylindrical head.

3. The mount of claim 1 wherein the bolt-receiving bore includes an enlarged portion communicating with the upper surface of the cylindrical head and being adapted for receiving a head of a bolt therein.

4. The mount of claim 3 wherein the bolt-receiving bore includes a reduced diameter portion having a first end communicating with the enlarged portion of the bolt-receiving bore and a second end communicating with lower face of the cylindrical head, the reduced diameter portion of the bolt-receiving bore being adapted for receiving the bolt therethrough.

5. The mount of claim 1 further comprising a bolt and nut combination for interconnecting the plate mount to the frame member of the frame assembly, the bolt extendable through the bolt-receiving bore and the nut receivable in the slot in the frame assembly.

6. A mount for mounting a plate having an inner face, an outer face and an aperture defined by an inner surface extending between the inner face and the outer face to a frame assembly including a frame member having an outer surface, defining a longitudinal axis, and having a slot that extends parallel to the longitudinal axis and a cavity that extends parallel to the longitudinal axis and connects to the slot, comprising:
 a nut removably receivable in the cavity;
 a generally cylindrical head extending along a head axis, being receivable in the aperture in the plate and having an upper portion, an upper surface, a lower face, an outer peripheral surface, a rail structure intersecting the lower face and receivable in the slot of the frame member, and a bolt-receiving bore extending through the cylindrical head along a bore axis at an acute angle to the head axis, the outer peripheral surface of the cylindrical head including a tapered portion frictionally engageable with the inner surface of the plate and the rail structure including first and second sidewalls that diverge from each other as the first and second sidewalls walls extend away from the lower face of the cylindrical head toward the upper portion of cylindrical head;
 a flange extending radially from the outer peripheral surface of the cylindrical head, the flange having a diameter;
 a bolt extends angularly through the slot and engageable with the nut received in the cavity so to interconnect the cylindrical head to the frame member, wherein threading the bolt into the nut exerts a clamping force on the plate between the flange and the frame member.

7. The mount of claim 6 wherein the frame member includes an outer abutment wall that defines at least a portion of a periphery the slot, and an inner abutment wall that is connected to the outer abutment wall and that defines at least a portion of a periphery of the cavity, and wherein the nut further includes a top wall and a shoulder that extend in a transverse direction away from the top wall, the shoulder engageable with the inner abutment wall of the frame member.

8. The mount of claim 7 wherein the nut includes a sidewall that extends between the top wall and the shoulder.

9. The mount of claim 6 wherein the first and second sidewalls of the rail structure intersect the lower face of the cylindrical head.

10. The mount of claim 6 wherein the bolt-receiving bore includes an enlarged portion communicating with the upper surface of the cylindrical head and being adapted for receiving a head of the bolt therein.

11. The mount of claim 10 wherein the bolt-receiving bore includes a reduced diameter portion having a first end communicating with the enlarged portion of the bolt-receiving bore and a second end communicating with lower face of the cylindrical head, the reduced diameter portion of the bolt-receiving bore being adapted for receiving the bolt therethrough.

\* \* \* \* \*